United States Patent
Anderson et al.

[15] 3,695,322
[45] Oct. 3, 1972

[54] PEACH PITTER

[72] Inventors: Gerald R. Anderson, Campbell; William C. Wann, Jr., San Jose, both of Calif.

[73] Assignee: FMC Corporation, San Jose, Calif.

[22] Filed: Aug. 5, 1970

[21] Appl. No.: 61,210

[52] U.S. Cl. .............................................. 146/28 R
[51] Int. Cl. .............................................. A23n 3/08
[58] Field of Search......... 146/28 R, 28 A, 238, 17 R, 146/17 A

[56] References Cited

UNITED STATES PATENTS

| | | | |
|---|---|---|---|
| 2,588,575 | 3/1952 | Rollins, Jr. | 146/28 R |
| 2,652,085 | 9/1953 | Ansley | 146/28 R |
| 1,042,590 | 10/1912 | Nyswonger | 146/28 R |
| 2,906,307 | 9/1959 | Ciraolo | 146/28 R |
| 3,310,084 | 3/1967 | Anderson et al. | 146/52 |
| 3,363,657 | 1/1968 | Buchner | 146/238 |
| 2,903,031 | 9/1959 | Anderson | 146/28 R |

FOREIGN PATENTS OR APPLICATIONS

| 1,348,938 | 12/1963 | France | 146/28 R |
|---|---|---|---|

*Primary Examiner*—Willie G. Abercrombie
*Attorney*—F. W. Anderson and C. E. Tripp

[57] ABSTRACT

An apparatus for pitting peaches comprising a multiple lane orienter for aligning the peaches so that their suture planes are transverse to the direction of motion through the apparatus. A continuous cup conveyor has transverse rows of apertured fruit products that move with a swinging pitting head. The head has a row of bifurcated peach splitting and pit gripping blades descend on the peaches while peach incising and pit gripping blades are projected up through the cup apertures. The upper blades are then spread apart to separate the peach halves from their pits.

4 Claims, 25 Drawing Figures

FIG_6

FIG_7

FIG_8  FIG_9

FIG_10

FIG_11

FIG_17

FIG_18

FIG_19

FIG_23

FIG_24

FIG_25

3,695,322

PEACH PITTER

FIELD OF THE INVENTION

The present invention pertains to apparatus for continuously bisecting and pitting indented seamed fruit and in particular devices of the type which employ multiple normally contiguous but separable splitting blades.

DESCRIPTION OF THE PRIOR ART

Buchner U.S. Pat. No. 3,219,080 issued Nov. 23, 1965 shows a single lane pitter having a splitting blade turret that rotates in a vertical plane. Properly oriented peaches are impaled on the splitting blades and pit engaging blades. Each blade unit is indexed to a position where an externally circumferential blade completes bisection of the peach flesh and engages the outwardly facing end of the pit. The splitting blades then open, severing the bisected flesh halves and thereafter the pit is released and the blades return to the closed position.

Ciraolo U.S. Pat. No. 2,906,307 issued on Sept. 29, 1959 employs a single lane cup conveyor to feed fruit between a pair of vertically opposed rotary cutting discs that rotate in unison so that pit gripping recesses in each of the discs cooperate. The lower disc always projects up through a slot in the conveyor. The upper disc has a flipper finger pivoted for fore and aft swinging motion as well as lateral swinging. This finger enters the slit in the fruit made by the disc and pivots rearwardly with the fruit as it advances. A cam then pivots the finger laterally outward from the disc separating the fruit halves and finger then swings rearwardly to enter the slit in the next fruit to be pitted. The flipper finger only operates on the upper parts of the peach.

Figure 4:
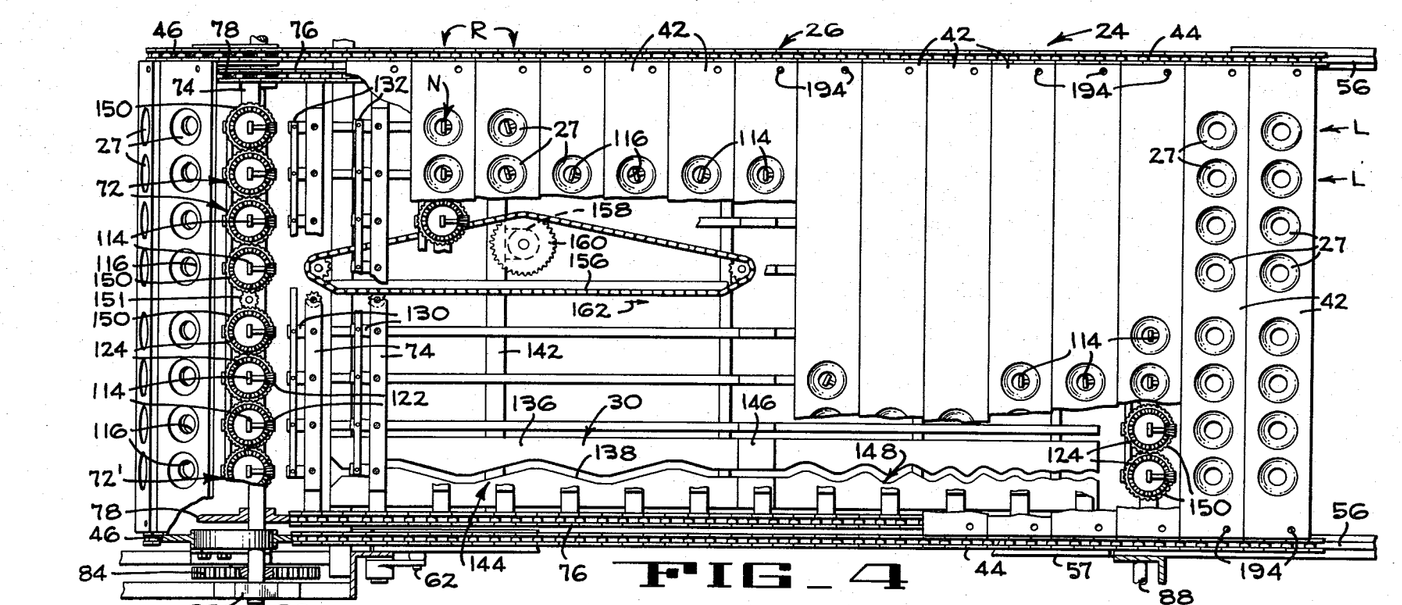
FIG. 4 is a partial plan view of the conveyor and orienter section having portions broken away.

In Nyswonger U.S. Pat. No. 1,042,590 issued Oct. 29, 1912 the fruits are impaled on a row of notched blades on a multi-lane endless conveyor. The conveyor advances in an intermittent step motion under a fixed pitting head. This head comprises vertically reciprocating notched pitting knives (Fig. 3) and side entry pitting knives (FIG. 4). Upon (FIG. the fruit, the pitting knives are brought together under the pit. The upper blades are raised and the pitting knives are separated to release the pit.

SUMMARY OF THE INVENTION

The pitting machine of the present invention makes possible the commercial use of the so-called "flip pitting" operation on a multi-lane, high speed machine. In the pitter of the present invention, transverse rows of fruit cups are mounted on a continuous conveyor. A swinging pitting head is timed to move cyclically with the cup conveyor. Bifurcated incising blades descend and incise peaches in the cups while gripping the pits from above. Combined peach incising and pit grippers rise through the cup apertures to lift the peaches from their cups. With the peaches thus incised and lifted, the bifurcated blades are spread apart to flip the peach halves from their pits. This construction makes it possible to use the prior known flip pitting principle on a multi-lane continuous machine with an attendant high rate of production.

A feature of the present invention lies in the blade construction. The upper blades are deep enough to extend over almost the entire vertical diameter of the peach. The lower blades fit into the bifurcations of the upper blades and thus complete the cut. Since the blades are operated so that the lower blades lift the peaches from the cup, the upper blades can flip the peach halves apart, even though the upper blades encompass substantially the entire peach.

Other objectives and further advantages will become apparent from the following drawings and description of the invention.

DESCRIPTION OF THE PREFERRED EMBODIMENT

Figures 1, 2, 3:
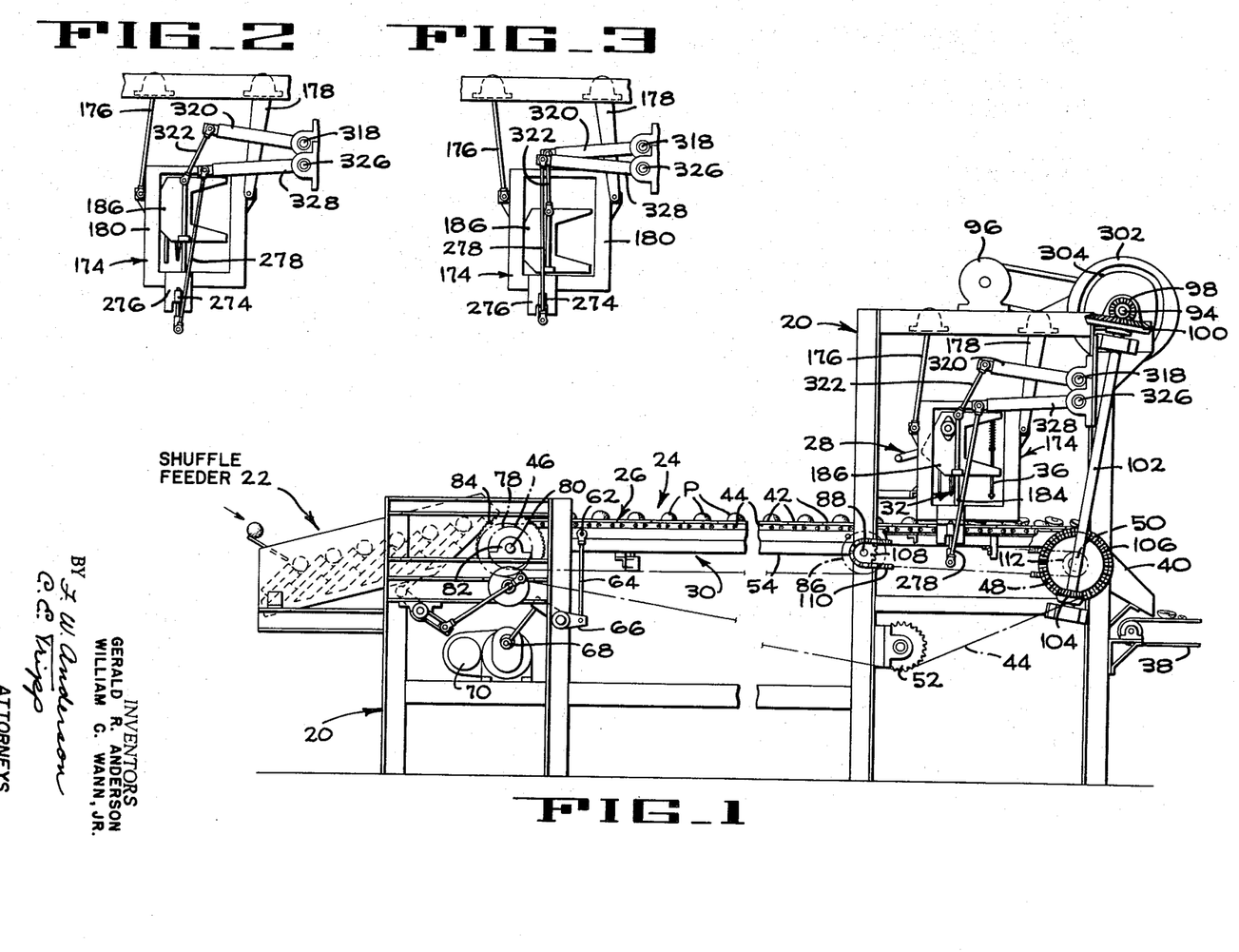
FIG. 1 is a side elevation of a fruit processing machine embodying the present invention.
FIG. 2 is a partial diagrammatic side elevation with the pitting head frame in the rearward position and the splitting blades in the raised position.
FIG. 3 is a view similar to FIG. 2 with the frame moved forwardly and the splitting blades in the lowered position.

The peach pitter of the present invention, as seen in FIG. 1, has a frame structure generally indicated at 20. On the frame there is a shuffle feeder 22 similar to that illustrated in United States to Chamberlin, U.S. Pat. No. 3,088,577, issued May 7, 1963. This feeder receives seamed indented fruit such as peaches P or the like and supplies them in transverse rows to an orienter section 24 through which runs a continuously moving, multi-lane cup conveyor 26 having transverse rows R of cups 27, forming lanes L of peaches (FIG. 4). The cup conveyor 26 conveys the oriented peaches to a pitting head 28 (FIG. 1) where the peaches are bisected along their suture planes and the pits are removed. The pitting head 28 includes vertically reciprocal peach splitting and flipping blade units 32, vertically reciprocal pit grippers 34 (FIGS. 10–13), and indexing pins 36 for insuring alignment of the pitting head with the cup conveyor 26. It is to be understood that each longitudinal lane L of cups 27 (FIG. 4) supplies one of the blade units 32 and its cooperating pit gripper 34. The blade units and pit grippers for each lane are ganged together to effect pitting of an entire transverse row R of peaches in one reciprocation. After pitting, the resulting peach halves and separated pits are carried to the forward or discharge head of the cup conveyor 26 and are delivered to a take-away conveyor 38 for further processing by a chute 40.

CUP CONVEYOR

Figure 5:
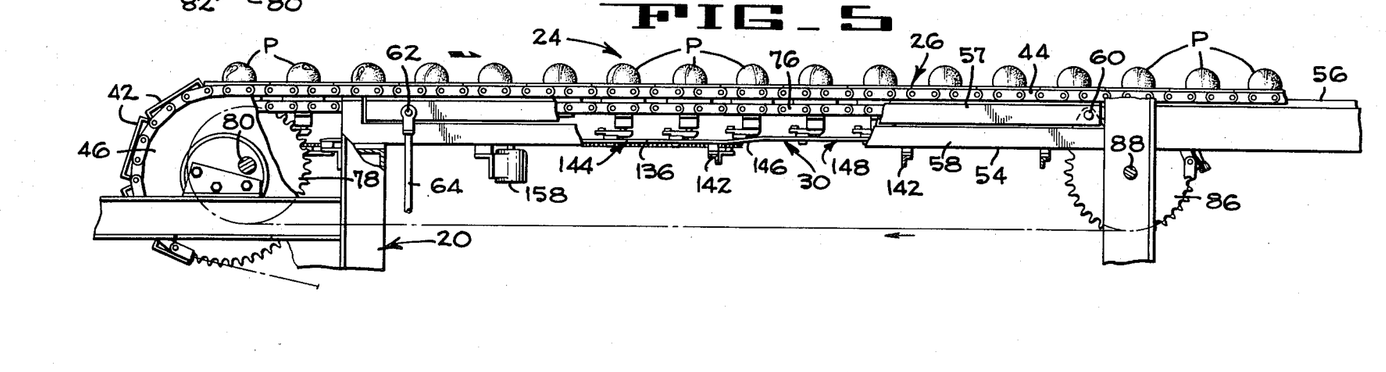
FIG. 5 is a side elevation of FIG. 4 having portions broken away.
Figure 6:
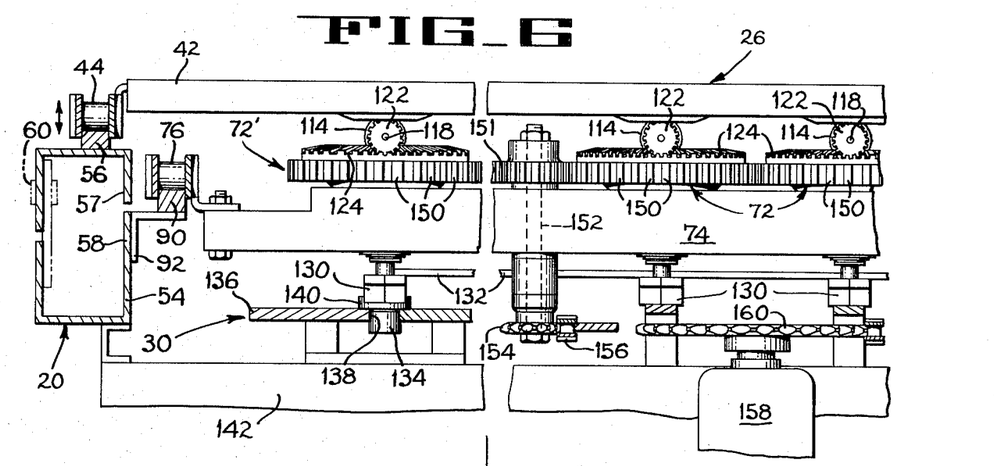
FIG. 6 is a partial cross-section of FIG. 4 taken on line 6—6 illustrating the fruit orienting mechanism.

The cup conveyor 26 as seen in FIGS. 4, 5 and 6 includes an endless series of transverse flights 42 in which the peach receiving cups 27 are formed. Each flight 42 is mounted between a pair of conveyor side chains 44. At the receiving end of the conveyor, the chains 44 are supported on idler sprockets 46. Referring to FIG. 1, the forward portion or discharge end of the cup conveyor is trained over a pair of driving sprockets 48 attached to a continuously driven head shaft 50 supported from the frame. A pair of idler sprockets 52 (only one being shown) adjustably mounted on the frame serve to guide and tension the return run of the cup conveyor.

The side chains 44 of the upper run of the conveyor 24 extending between the shuffle feeder 22 and the pitting head 28, are further supported by horizontal box beams 54 that form a part of the frame 20. Referring to FIGS. 4 through 6 it can be seen that the side chains 44 are guided and slide on ways 56. An orienter unit 30 is disposed between the shuffle feeder 22 and the pitter head 28.

In order to vertically oscillate the conveyor in the area where the orienter 30 is effective, each box section 54 is split into a pivoted upper section 57 and a lower section 58 (FIGS. 5 and 6). The upper section 57 is pivotally joined to the lower section by means of pins 60. The rearward ends of the upper box section 57 are pivoted at 62 to vertically reciprocating links 64. These links are pinned to an oscillating crank 66 as seen in FIG. 1. The crank arm 66 is linked to an eccentric 68 driven by an oscillating motor 70. When the motor is driven, the eccentric rotates at several hundred cycles per minute thereby imparting a short rapid vertical vibration to the conveyor flights supported by the upper box sections 52. This vibration is employed to assist in the indent and suture plane finding operations or in the orienting operation to be described later.

Apparatus for finding the fruit indent and aligning the fruit suture plane with the splitting blades will now be described in detail. However, the details of this apparatus are not critical to the present invention. An apparatus for finding the indent and aligning the suture plane which employs the orienting structure described in this application, and which incorporates an additional vibrating feature forms the subject matter of the copending application of Gerald R. Anderson, Ser. No. 65,834 filed Aug. 21, 1970 (SJ 5687).

ORIENTER

The purpose of the orienter is to continuously align multiple peaches carried in the cups 27 of the multilane conveyor 26. The orienter 30 is located directly below the upper run of the conveyor 26 (FIGS. 1, 4, 5 and 6), and includes transverse rows of aligner units 72 mounted in carriages 74 that extend transversely between aligner side chains 76. As best seen in FIGS. 1 and 5, the side chains 76 at the rear of the orienter are trained about sprockets 78 secured to a transverse tail shaft 80. The tail shaft is rotatably supported in bearings 82 on the frame (FIG. 4) and mounts a gear 84 for driving of the shuffle feeder 22. The details of this drive are not critical to the present invention and are shown in the aforesaid Chamberlin patent.

At the forward end of the orienter 30, the side chains 76 are trained about head sprockets 86 that are attached to a cross-shaft 88 rotatably mounted on the frame 20. Intermediate the orienter tail and head sprockets the side chains 76 are supported and guided by ways 90 (FIG. 6). It is to be noted that these ways are attached to the lower fixed sections 58 of the box beam 54 by means of angle brackets 92 so that the orienter is not vertically oscillated as is the cup conveyor 26.

CONVEYOR AND ORIENTER DRIVES

Referring to FIG. 1, the drive for the reciprocating pitting head 28 and for the cup conveyor is taken from a main cross shaft 94. This shaft is driven through a motor gear reduction 96 best seen in FIGS. 1 and 16. The cup conveyor 26 must be synchronized with the pitting head 30 and therefore is also driven from the main shaft 94. In the illustrated construction, a bevel pinion 98 on shaft 94 drives a bevel gear 100 on a vertical shaft 102. At the lower end of shaft 102, a bevel pinion 104 drives a bevel gear 106 on the head shaft 50 for the cup conveyor 26. The cup conveyor side chains pass over drive sprockets 48 on shaft 50. Synchronization of the cup conveyor 26 and orienter 30 is accomplished by providing a sprocket 108 on cross shaft 88 to which the head sprockets 86 (FIG. 5) of the orienter 30 are mounted. A chain 110 is trained around the sprocket 108 and engages a similar sprocket 112 (shown in phantom line in FIG. 1) secured to the head shaft 50 of the cup conveyor.

ALIGNER UNITS

Figures 7, 8, 9:
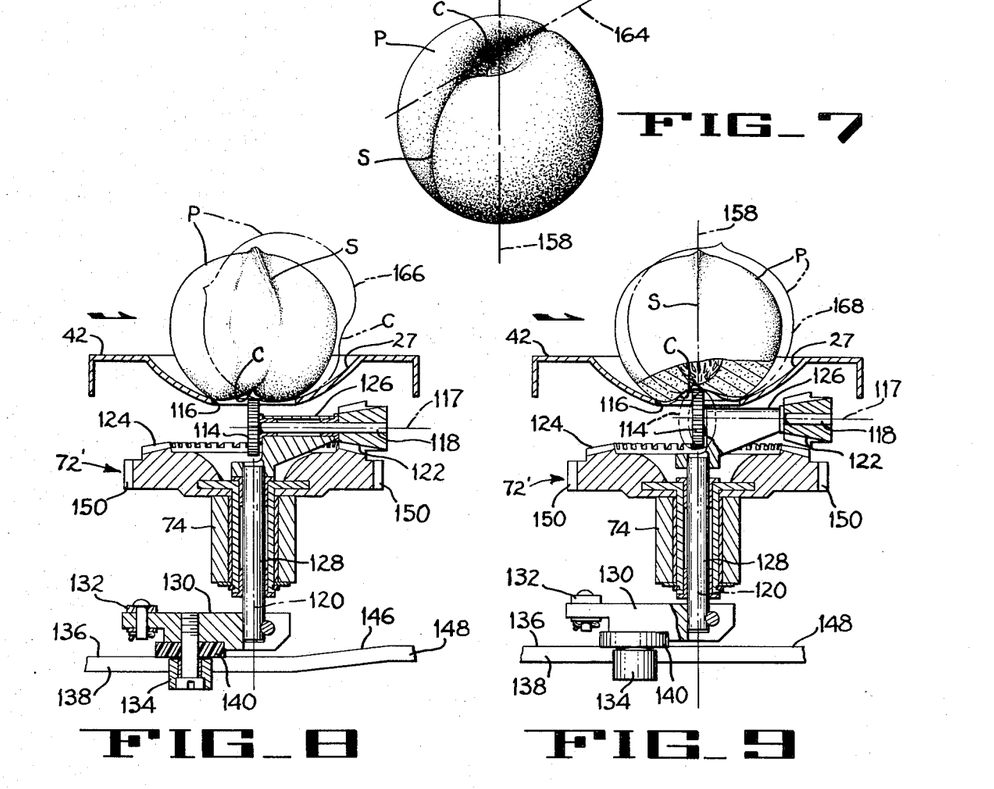
FIG. 7 is a perspective view of a peach showing the stem cavity.
FIG. 8 is an enlarged side elevation of a fruit aligning unit in the indent seeking mode.
FIG. 9 is a view similar to FIG. 8 where the aligning unit is in the suture plane seeking mode.

As mentioned, each of the carriages 74 of the orienter mount multiple adjacent aligner units 72 as best seen in FIGS. 4 and 6. Each of these units has a finder wheel 114 that projects into the cups 27 in the conveyor flight and through the apertures 116 as best seen in FIG. 8 and 9. The finder wheels are subjected to two different motions to accomplish orientation of the peaches P. The finder wheel 114 is rotated about a horizontal axis 117 coinciding with its mounting shaft 118. A second motion imparted to the finder wheel is an oscillation about a vertical axis indicated at 120.

Rotation of the finder wheel 114 is produced by a bevel pinion 122 mounted on the outer end of the wheel shaft 118 that meshes with a bevel drive gear 124. The finder wheel 114, shaft 118 and the pinion 122 are supported by a wheel arm 126 that in turn is attached to the upper end of a vertical central shaft 128. This shaft is mounted in the carriage 74 so that it may rotate about its vertical axis 120 and slide vertically in the carriage.

A cam arm 130 is pinned to the lower portion of the central shaft 128 to oscillate the central shaft and the wheel arm 126 about the central axis 120. As will be seen, the arm 130 can also be lifted to effect raising and lowering of the wheel arm to engage and disengage the pinion 122 from its drive gear 124. The upward movement of the cam arm and central shaft 128 is further effective to vary the amount of projection of the finder wheel 114 into the cup 27 through the aperture 116. The cam arms 130 of the aligner units 72 mounted on each carriage 74 are interconnected (FIG. 4) by means of a pinned interconnecting strap 132 such that all of the finder wheels will be oscillated in unison.

One of the finder units 72 is employed as a master unit as indicated at 72', and in the present embodiment the master unit is the left most aligner unit mounted on each carriage 74 when looking towards the shuffle feeder as seen in FIG. 6. The master aligner unit 72' differs from the remaining aligner units in that a cam roller 134 is mounted in the bottom of the cam arm 130 and projects downwardly for engagement with a fixed oscillating cam 136 having a cam track 138. This cam roller 134 acting in cam track 138 produces the finder wheel oscillation to be described presently. Additionally, a shoe 140 is mounted between the cam roller 134 and the cam arm 130 to provide low friction contact between the upper surface of the cam 136 and the cam arm 130. The cam 136 (FIG. 6) is supported from the box frame section 58 by means of support brackets generally indicated at 142.

FINDER WHEEL OSCILLATION

Oscillation of the finder wheel 114 about the vertical axis 120 is produced by the action of the cam roller 134 and the cam track 138, as the aligner units 72 move forwardly in unison with the cup conveyor 26. The path of the cam track 138 is best seen in FIG. 4. Upon entering the cam track the roller encounters an indent seeking portion 144. This portion of the cam track produces a relatively slow, constant frequency and constant amplitude and oscillation of the finder wheel through an arc of approximately 90° (45° to either side of a nominally transverse position of the wheel 114 as indicated at N). Located at the forward end of the index seeking portion of the cam track 138 is a ramp section 146. This section of the cam can also be seen in FIG. 5, however, it is best seen by comparing FIGS. 7 and 8.

When the cam roller passes into the suture-seeking section cam track 148, where the cam arm 130 is maintained in a raised position thereby disengaging pinion 122 from the drive gear 124, the finder wheel 114 is raised further up into the cup 28 into a suture seeking position.

Referring back to FIG. 4 it can be seen that the suture-seeking cam track indicated at 148 has a non-uniform path. In this section the roller 134 subjects the finder wheel 114 to an oscillation which decreases in amplitude while increasing in frequency. The amplitude decreases to zero upon reaching the end of the cam and the finder wheels are then oriented in the normally transverse position.

As previously explained, the oscillating motion is transferred to the other cam arms of the finder liner units 72 located on a common carrier 74 by means of the pin strap 132.

FINDER WHEEL ROTATION

When the cam arm 130 is in the lowered position in FIG. 7 it can be seen that rotation by the drive gear 124 will cause rotation of the finder wheel 114 about the horizontal axis 117 through pinion 122. The drive gear 124 further includes gear teeth around its periphery as indicated at 150. As seen in FIGS. 4 and 6 the aligner units 72 on a common carrier 74 and are mounted closely adjacent each other so that the peripheral gear teeth 150 of the adjacent units mesh thereby providing a continuous gear train across each carrier 74.

This gear train is driven by means of a pinion 151 interposed between two of the drive gears 124. The pinion is secured to the upper end of a vertical drive shaft 152 that passes through the carrier and is rotatably received therein. A sprocket 154 is attached to the lower end of the shaft 152 and engages the outside of a horizontal drive chain 156 which is driven by a motor 158 through sprocket 160 in the direction indicated by arrow 162 (FIG. 4).

As each carrier 74 advances, its sprocket 154 externally engages the forwardly driven chain 156 resulting in rotation of all the finder wheels 114. It is to be noted that the drive chain 156 is effective to drive the finder wheels 114 only during the indent or cavity seeking operation corresponding to section 144 of the cam track.

PEACH ORIENTING OPERATION

The successive orienting operations on the single peach P in one of the cups 28 will now be described. A typical peach P is shown in FIG. 7 having an elliptical cavity C at the stem end of its stem blossom axis indicated at 158. The elliptical cavity C has a major axis 164 that coincides with the suture plane S of the peach. In FIG. 8, the peach is shown in its cup 27, it being assumed that the cup conveyor flight 42, aligner unit 72' and its carriage 74 are at the start of the indent seeking section 144 of the cam 136. The finder wheel 114 is being driven and projects slightly into the cup through aperture 116 thereby rotating the peach. As the cup conveyor flight 42 and aligner unit 72' advance together in the direction of arrow 162, the finder wheel is oscillated about the vertical axis 120 through arcs of 45° to either side of the nominal position N of the finder 114 as shown, so that the peach is rotated in varying planes.

If the peach should be rolled to a position toward the side of the cup 27 as indicated in phantom line at 166 (FIG. 8), the vertical vibration to which the conveyor flights 42 are subjected will urge the peach back into the center of the cup and into driving engagement with the finder wheel. When the peach has been rolled into a position with its cavities C toward the bottom of the cup as shown in solid line, the finder wheel 114 no longer engages the surface of the peach P. It is to be noted that the suture plane S of the peach is not necessarily in alignment with the finder wheel 114 at this time. As the conveyor flight 42 and aligner units 72' advance, the finder wheel 114 is then raised to the suture finding position of FIG. 9, where it is no longer rotated but is only subjected to the rapid oscillating motion about the vertical axis 120. Raising of the finder wheel 114 raises the peach, as indicated at 168, when the suture plane S and major axis 170 of the elliptical cavity C do not coincide with the plane of the finder wheel 114. The oscillating motion of the wheel shifts the peach about its substantially vertical stem blossom axis 164 until the elliptical cavity C is aligned with the finder wheel 114 and the peach settles thereon as indicated in solid lines in FIG. 9.

Thereafter, the peach turns with the finder wheel 114, the oscillation of which is increasing in frequency but decreasing in amplitude, thereby further settling the peach. Upon reaching the end of the cam, the peaches P are oriented with their suture planes S transverse to the direction of the cup conveyor. At the end of the orienter (FIG. 5) the aligner units 72 turn downwardly around the head sprockets 86 and the aligned peaches resting in the cup conveyor 26 continue to the pitting head 28.

PITTING HEAD

Figure 10:
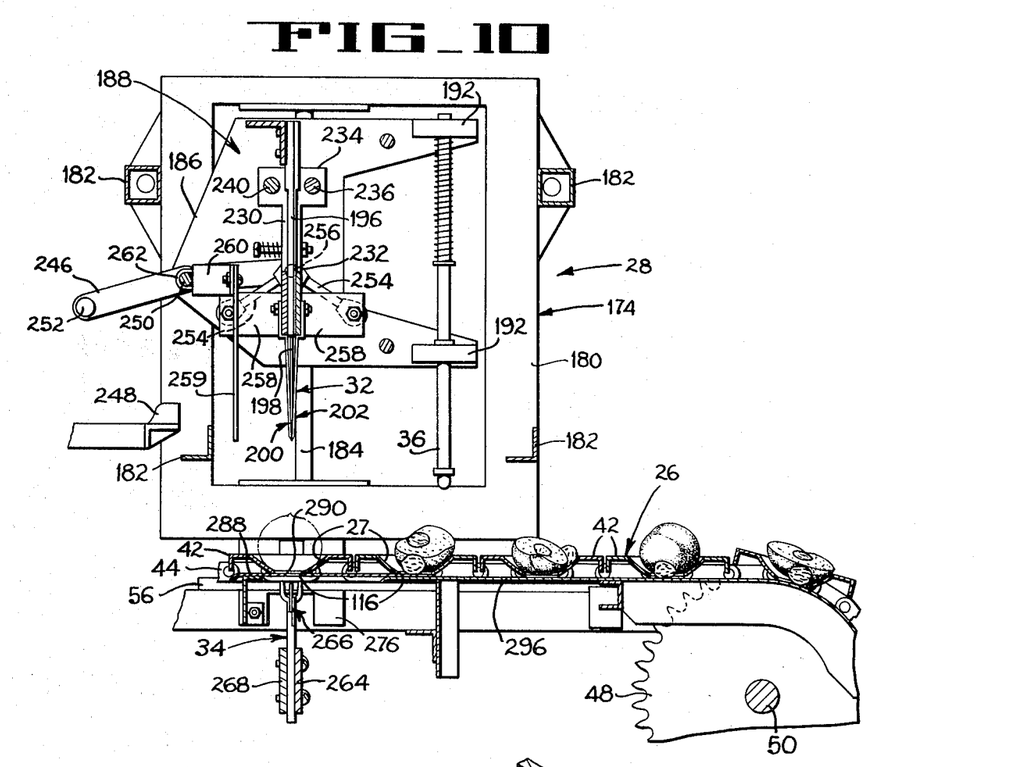
FIG. 10 is an enlarged central section taken at the pitting head.
Figure 12:
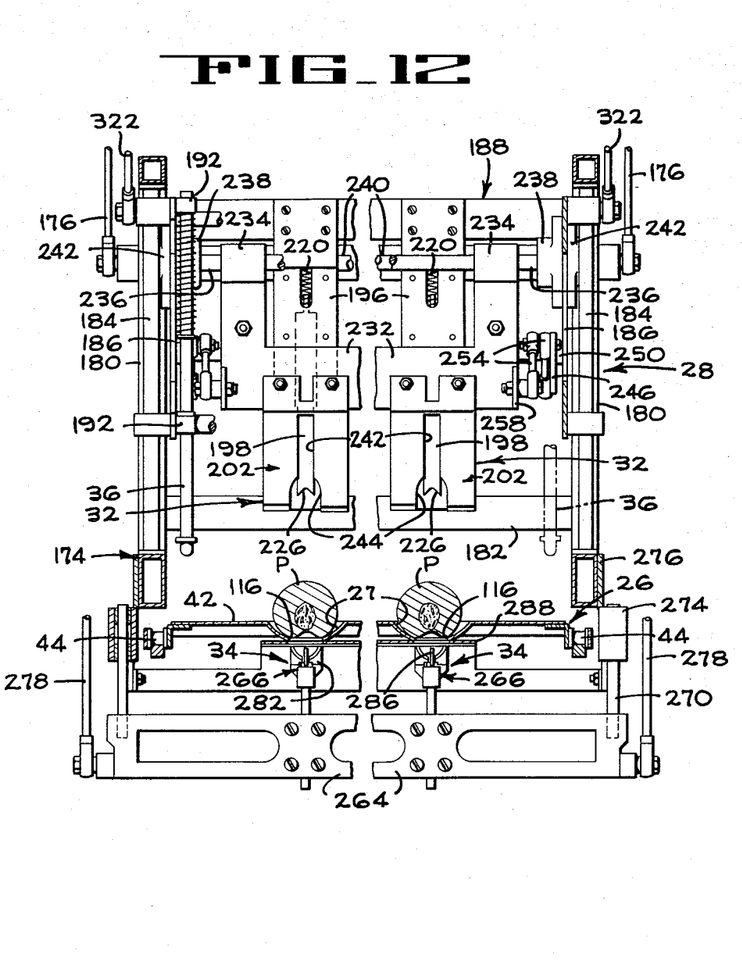
FIG. 12 is a cross-sectional view taken on line 12—12 of FIG. 10 with the splitting blades in the raised position.
Figure 13:
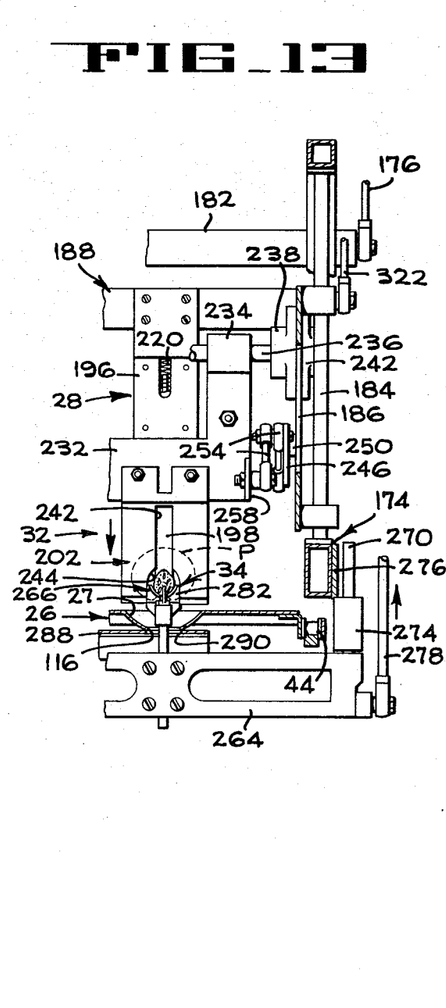
FIG. 13 is a partial view similar to FIG. 12 wherein the splitting blades are in the lowered position.

The pitting head generally indicated at 30 in FIG. 1 includes a frame 174 to be reciprocated longitudinally in synchronism with the cup conveyor 26. For this purpose the reciprocating frame 174 is supported at each side from the general machine frame 20 on oscillating pivot arms 176 and follower links 178 which provide substantially linear motion for the reciprocating frame. Referring now to FIGS. 10, 12 and 13, the frame comprises rectangular box end sections 180 at either side joined by transversely extending members 182. Each end section 180 includes a vertical rod 184 on which side plates 186 are slidably mounted. These side plates form a part of a splitting head holder 188 that extends transversely across the machine and mounts multiple peach splitting and flipping blade units 32.

In order to insure accurate transverse alignment of the splitting head holder 188 and the splitting blade units 32 mounted thereon, the vertically spring loaded index pins 36 (only one being shown in FIGS. 10 and 12 are slidably mounted in bosses 192 on each side plate 186. On lowering of the splitting head holder, these index pins engage apertures 194 at the end of each conveyor flight 42, such as shown in FIGS. 14 and 15, before the peach splitting and flipping operations take place.

SPLITTING BLADE UNITS

Figure 14:
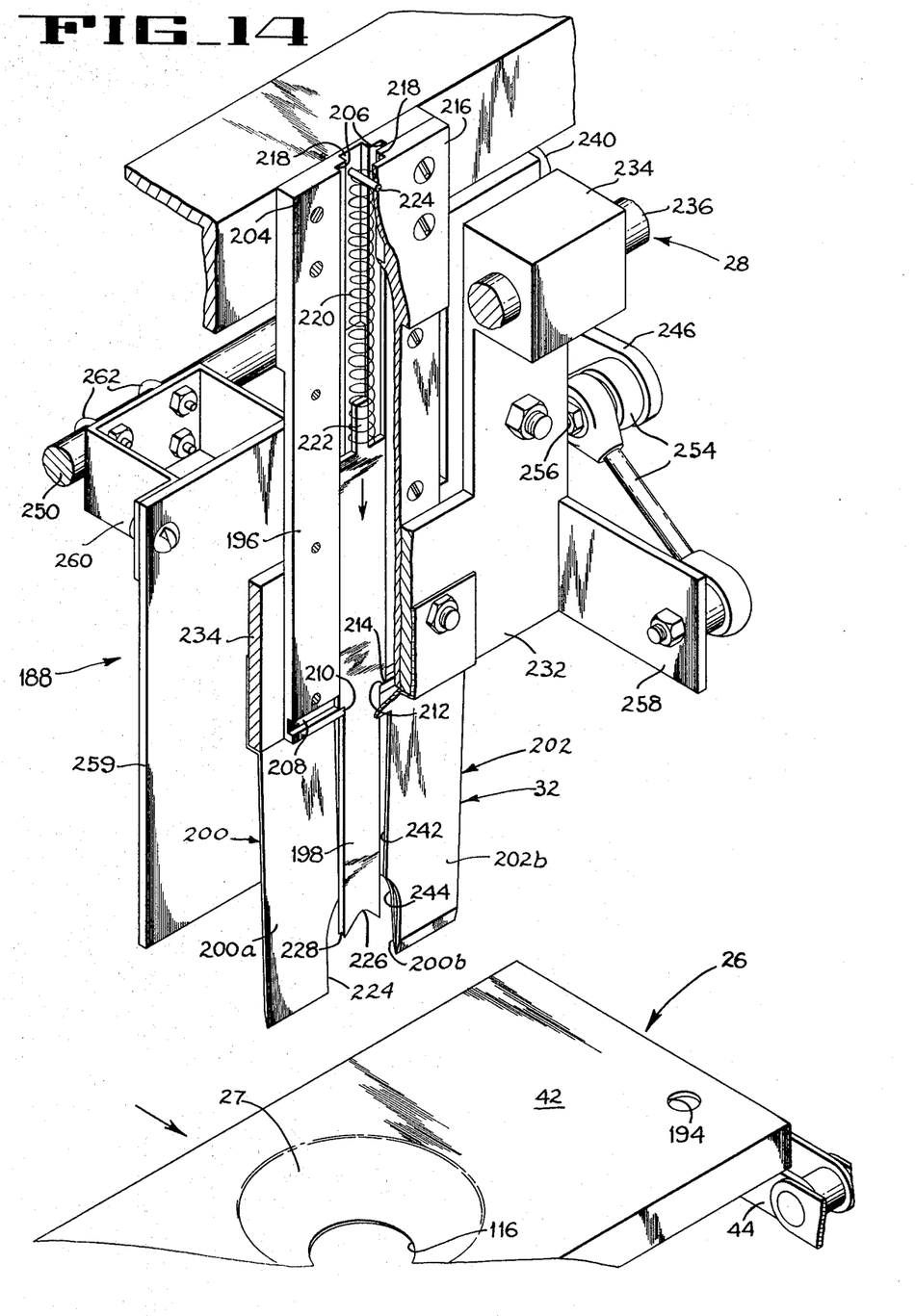
FIG. 14 is an enlarged partial perspective view of the splitting blades having portions broken away.
Figure 15:
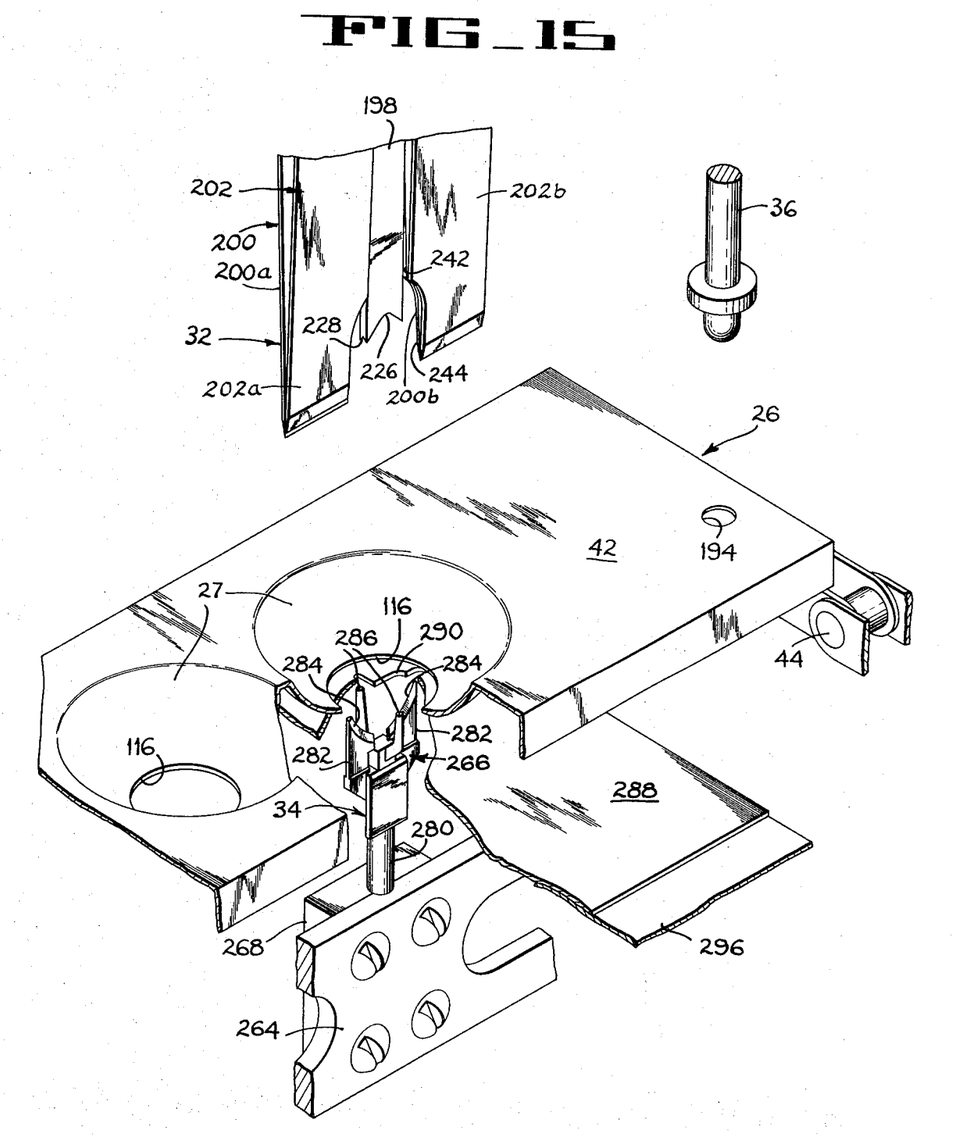
FIG. 15 is an enlarged partial perspective view showing the pit gripper.

Referring now to FIGS. 12 through 14, the splitting blade units 32, which form the subject matter of the present invention are employed to split the peaches while gripping the peach pits in conjunction with the vertical pit gripper assembly 34. Each splitting blade unit 32 includes a pair of normally closed, splitter and flipping blades 200,202. The blade 200 has transversely spaced blade elements 200a, 200b (FIGS. 14 and 15) for straddling the peach pits, which elements are joined at their top for mounting (FIG. 12). The blade 202 has matching blade elements 202a, 202b which are also joined at their top for mounting. Projecting down between the upper portions of the blades 200,202 is a pit blade holder 196 (FIG. 14) in the form of flat laterally spaced guide plates, and a resiliently loaded pit gripping blade 198 is slidably mounted between the pit holder guide plates. The blade units 32 are spaced along the splitting head holder 188 (FIG. 12) so that each unit is located above one of the cups of the longitudinally extending rows of conveyor cups 28 and reciprocate vertically in unison.

Each of the pit blade holders 196 (FIG. 14) includes a base plate 204 that contains guide slots 206 in which the upper pit gripping blade 198 is slidably received. These slots 206 terminate at a cross slot 208 having an opening at 210 narrower than the guide slots 206 thereby forming blade retaining shoulders 212 in the base that engage cooperating shoulders 214 on the pit gripping blade. A cover plate 216 is bolted to the side of the base plate 204 thereby retaining the upper pit gripping blade 198.

Both of these plates have opposed recesses 218 in their upper portions to receive a compression spring 220 for urging the gripping blade downwardly. The lower end of the spring encompass a projection 222 on the upper portion of the blade 198 while the upper end of the spring 220 is retained by a pin 224 between the plates 204 and 216. At the lower or tip of the pit gripping blade 198 there is a recess 226 formed to engage the peach pit. This recess also contains a transverse notch indicated at 228 for improved gripping action by engaging the flared lip commonly found on the suture line of the peach pits.

As previously mentioned, the splitter blades 200 and 202 of each splitting unit 32 are disposed on either side of the pit blade holder 196 associated therewith. All the blades 200 on one side of the pit blade holders 196 are attached to a common U-shaped blade bar 230 and the blades 202 on the other side to an identical bar 232. As seen in FIGS. 10 and 12, the upper portions of the bar 232 include bosses 234 attached to a blade pivot shaft 236. This shaft is rotatably mounted between the side plates 186 by means of internally facing flange bearings 238. Blade bar 230, identically mounted as bar 232, on shaft 240 pivotally secured in flange bearings 242 mounted on the outside of the end plates 186. This flange bearing arrangement is necessary because of the close proximity of the shafts 236 and 240.

The splitting blades 200 and 202 are individually attached to their respective mounting bars 230 and 232 and incline toward each other so that their tips are contiguous, as best seen in FIG. 10. In order to permit passage of the upper pit gripping blade 198 between the splitting blades 200 and 202, the splitting blades are slotted at 242, FIGS. 12 and 14. At the bottom of the slots 242 (FIG. 14) there is an enlarged recess 244 permitting the blade to pass on either side of the pit when incising the peach P.

In addition to splitting the peach, the blades 200 and 202 are effective to separate the peach flesh from the pit when the blades are opened by a pivoting motion of the blade mounting bars about their pivot shafts 236 and 240. This opening or flipping motion is produced when an actuator arm 246 engages a stationary cam 248 (FIG. 10) which is attached to the stationary frame structure of the machine 20 (not shown).

Referring now to FIGS. 10 and 14, the actuator arm 246 is pivoted on a mounting rod 250 that also extends between side plates 186. The free end of the arm 246 mounts a cam roller 252 for engagement with the previously mentioned stationary cam 248. Actuator links 254 are pivotably connected to the other end of the actuator arm 246 (FIG. 14) on a common pivot axis 256. These actuator links extend downwardly and outwardly from their common pivot 256 and are pivotally attached at their other ends to arm projections 258 on each of the U-shaped blade mounting bars 232. An upward force on cam roller 252 will lower the common pivot 256 of the links 254, thereby pivoting the blade bars and attached blades outwardly about their respective shafts 236 and 240. This provides a spreading or flipping motion of the blades 200,202 which severs the peach flesh from the pits.

In order to prevent the peach half that is separated by the blade 200 from being flipped rearwardly against the next peach to be pitted, thereby possibly disturbing its orientation (FIG. 19), a baffle 259 is positioned rearwardly of the blade 200. This baffle is attached to the actuator mounting rod 250 of the splitting head holder by means of a bracket 260 and U-bolts 262.

PIT GRIPPER ASSEMBLY

Figure 11:
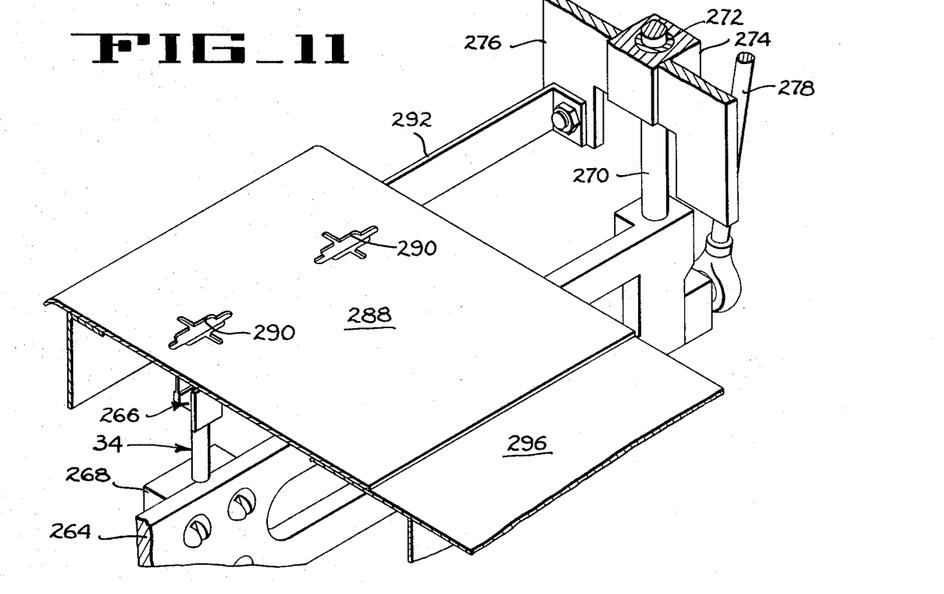
FIG. 11 is a partial perspective view of the pit gripper and pit stripper.

As the peach splitting and flipping units lower from the position of FIGS. 10 and 12, the peaches are engaged from below the cup conveyor 26 through the cup apertures 116 by the pit gripper assembly 34 and are raised above the level of the conveyor flight 42 as seen in FIG. 13. Referring to FIGS. 11 and 12, the pit gripper assembly includes a mounting bar 264 that extends transversely beneath the cup conveyor 26. Multiple prongs 266 are secured in alignment with apertures 116 and the blade units 32 above by means of clamping blocks 268 (FIG. 11). Each end of the mounting bar 264 has a vertical guide rod 270 that is slidably received in bearings 272 fitted within a block 274. These blocks are part of vertically reciprocating brackets 276 rigidly attached to the lower portions of the rectangular box end sections 180 of the longitudinally reciprocating frame 174 (FIG. 12). The mounting bar 264 and prongs 266 are vertically supported and reciprocated by actuator links 278 in a timed relationship with the splitting and flipping blade units 32 of the vertically reciprocable splitting head holder 188 as will be explained presently.

As the blade units 32 are lowered, as shown in FIG. 13, the prongs 266 are elevated and incise the peach from below, thereby being effective to grip the pit in conjunction with the upper pit gripping blades 198.

Figure 24:
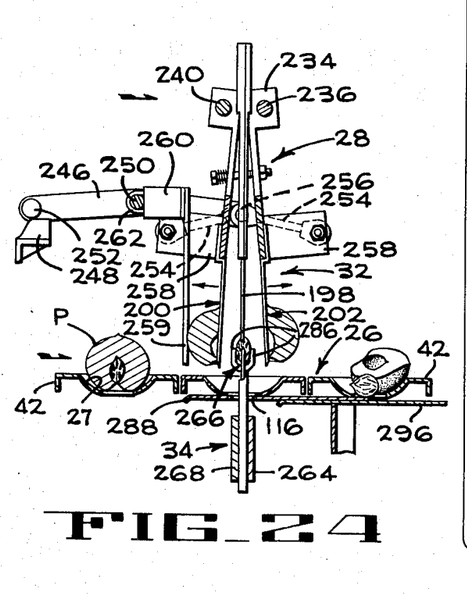
FIG. 24 is a view similar to FIG. 19 illustrating the flipping action of the blades.
Figure 25:
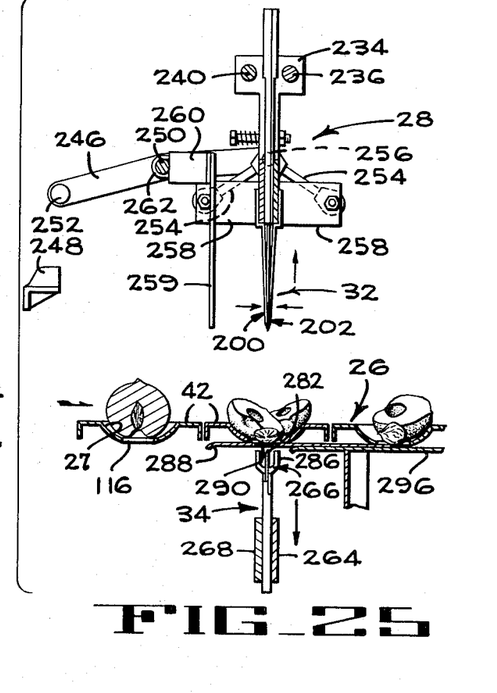
FIG. 25 is a view similar to FIG. 19 illustrating the retraction of the blades after completion of the pitting action.

Referring now to FIG. 15, wherein one of the prongs 266 is shown in detail, it can be seen that the prong is on the upper end of a vertical shaft 280 and has transversely oriented gripping blades 282, having sharp upper edges 284. In addition to incising the lower central portion of the peach under the pit, these edges 284 are shaped to conform to the pit for a more effective gripping action. The prong also includes longitudinally spaced projections 286 that are effective to center the pits on the blades 284 and prevent longitudinal or sideways motion of the pit during the splitting or flipping action of the blades 200 and 202 as illustrated in FIG. 24. These projections 286 taper outwardly and upward slightly and in conjunction with the curvature of the edges 284 enable effective gripping and longitudinal retention of various sized pits.

Upon completion of the flipping action of blades 200 and 202, the blades withdraw upwardly and the prong 266 is withdrawn downwardly through aperture 116 in the conveyor flight 42. In order to insure that a peach pit does not remain impaled between the gripper blades 282 and projections 286 of the prong after completion of the pitting, and interfere with successive pitting operations, a pit stripper plate 288 is located immediately below the conveyor flight 42 of the cup conveyor and above the mounting bar 264 for the prongs as seen in FIGS. 10 and 15. This stripper plate has a further advantage in that its stripping action in removing the pits from the prongs prevents indiscriminate dropping of the pits in the vicinity of the pitting head and eliminates possible interference of the free pits with successive pitting operations. The pit stripper plate contains openings 290 (FIG. 11) which are shaped to permit reciprocation of the prongs 266 therethrough but are sufficiently restricted in size to prevent passage of the pit. Therefore, upon retraction of the prong 266 at the end of the pitting cycle, the pit is stripped from the prongs and remains within the cup 27 (FIG. 10). In order to retain the apertures 116 in vertical alignment with the prongs 266 during the longitudinal reciprocation of frame 174, the pit stripper plate 288 is mounted to the frame 174 by means of a bracket 292 that is bolted between the pit gripper assembly to the reciprocating brackets 276 (FIG. 11).

In order to prevent the pits which preferably remain in the cups after being stripped from the prongs from later dropping through the apertures 116 in the conveyor cups, the pit stripper plate extends rearwardly and overlaps a pan 296 best shown in FIGS. 10 and 11. The pan 296 is mounted to the box beams 54 which support the cup conveyor 24 and is curved downwardly at its forward end where the cup conveyor reaches the discharge chute 40 (FIG. 1).

PITTING HEAD DRIVES

Figure 16:
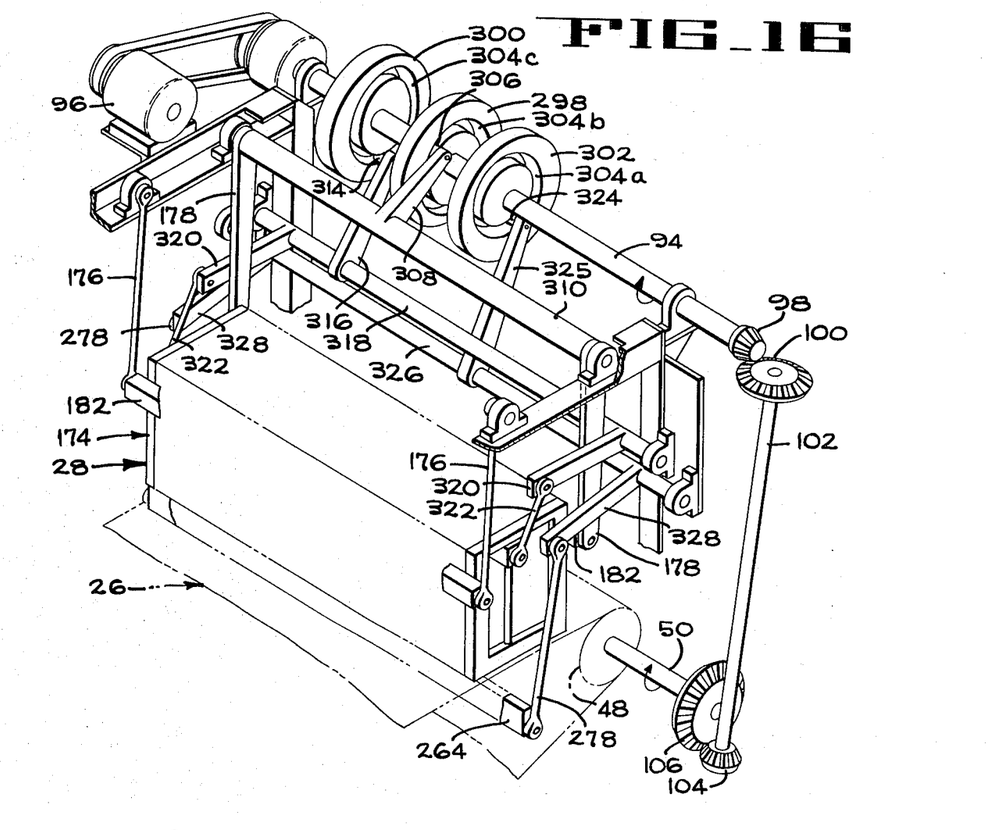
FIG. 16 is a diagrammatic perspective view of the pitting head drive train.

The manner in which the pitting head is driven can best be seen in FIG. 16. As previously described, the pitting apparatus of the present invention is driven by the motor and speed reducer generally indicated at 96 driving the main power shaft 94. Mounted on the shaft 94 are three cams 298, 300, and 302. Each of these cams contain a cam track at 304a, 304b and 304c, respectively, to produce the desired motions of the pitting head in a particular time sequence as will be explained later with reference to FIGS. 17 and 18.

The longitudinal reciprocation of the frame 174 is controlled by means of cam 298. A roller 306 mounted on one end of a cam follower 308 rides in the cam groove 304b and is displaced by rotation of the cam. This oscillates a transverse shaft 310 to which the cam follower arm 308 is attached. The previously described pivot arms 178 are secured to the outer ends of the transverse shaft 310 and are connected to the transverse supports 182 on the reciprocating frame 174.

The vertical oscillation of the splitting head holder 188 is controlled by means of cam 300. The cam groove 304c of this cam is engaged by a roller 314 on a follower arm 316 and transmits motion to the splitting head holder 188 via a transverse shaft 318. This shaft has actuating arms 320 that are in turn connected to the holder 188 by means of links 322.

Similarly, the pit gripper assembly is vertically oscillated in response to motion of the cam 302 by means of a cam follower 324 riding in the cam groove 304a and mounted on a follower arm 325. The arm 325 operates a cross shaft 326 having actuating arms 328 adjacent its outer ends. The connecting links 278 pivotally interconnect the actuating arms 328 and the mounting bar 264 of the pit gripper assembly, see also FIGS. 11–13.

PITTER OPERATION

Figure 17:
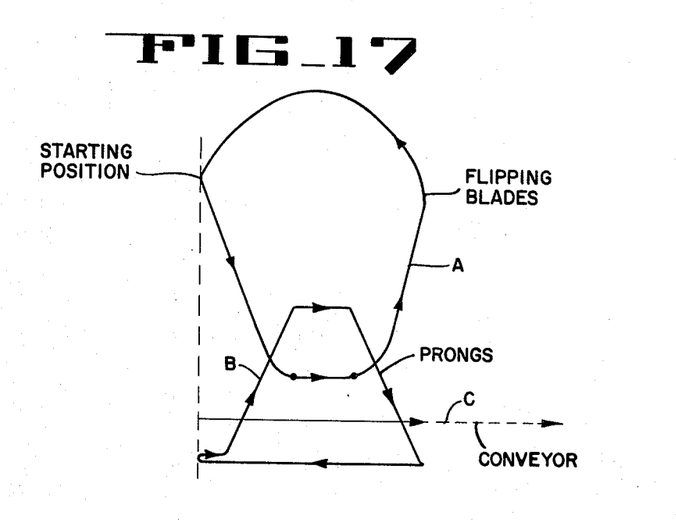
FIG. 17 is a diagrammatic view showing the paths of the cup conveyor, splitting blade top and pit gripper prongs.
Figure 18:
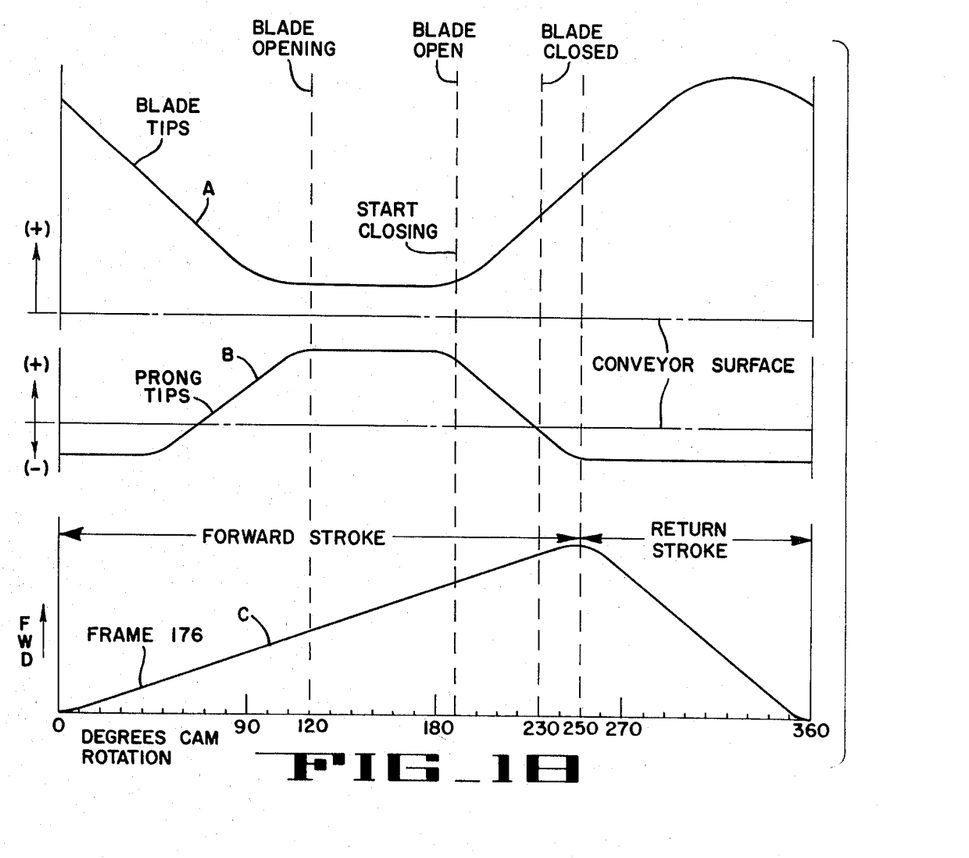
FIG. 18 is a timing diagram of the pitting head mechanism.
Figure 19:
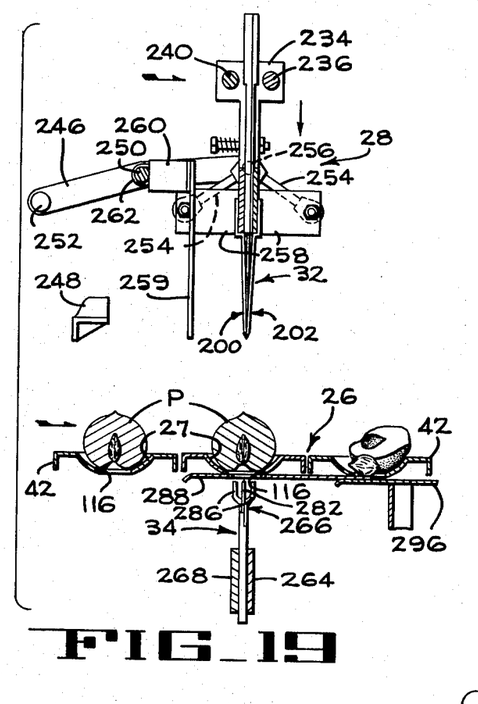
FIG. 19 is a partial diagrammatic side view of the pitting mechanism in the starting position.
Figure 20:
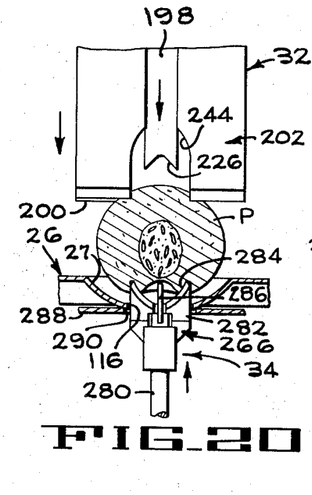
FIG. 20 is a partial diagrammatic front view of the pitting mechanism during initial incising.
Figure 21:
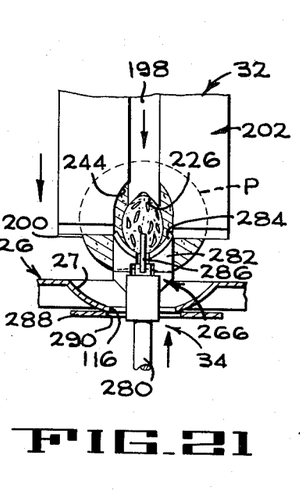
FIG. 21 is a view similar to FIG. 20 at the midpoint of the incising step.
Figure 22:
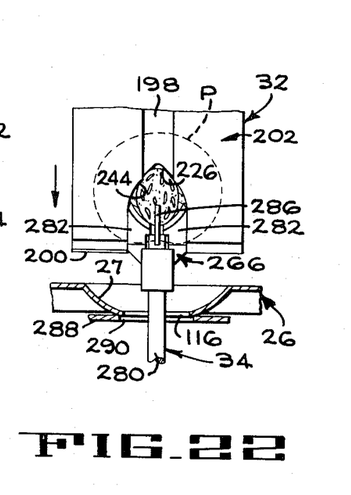
FIG. 22 is a view similar to FIG. 20 at the completion of the incising step.

FIGS. 20–22 are operational diagrams as viewed endwise of the machine, and FIGS. 19 and 23–25 are similar diagrams as viewed from the side of the machine. FIG. 17 traces the paths of the blades, prongs and conveyor as viewed from the side, and FIG. 18 shows the timing of one 360° cycle of the pitting head 28.

After the peaches P have been aligned with their suture planes transverse to the direction of motion of the cup conveyor 26, they pass under the pitting head 28. As previously explained, the frame 174 of the pitting head reciprocates longitudinally in synchronization with the cup conveyor 26. The pitting cycle starts with the frame 174 in the rearward position as seen in FIG. 2 and which is the position of the splitting b lade unit 32 shown in FIG. 19. The splitting blade units 32 are initially in their raised position as best seen in the diagrammatic illustration of FIG. 19. As the cup conveyor 26 with the peaches moves forwardly, the pitting head frame 174 also moves forwardly while the splitting blade units 32 are lowered.

The relative paths of these motions are best seen in the diagram of FIG. 17 where the abscissa of these curves designates horizontal motion and the ordinate, vertical motion. Curve A describes the profile of cam track 304c which controls the vertical reciprocation of the splitting and flipping blades 200 and 202. Curve B represents the cam profile 304a that controls the vertical reciprocation of the pit grippers 34 and curve C describes the profile of cam 304b which produces the horizontal reciprocation of frame 174. All three curves have a common abscissa representing 360° of cam rotation corresponding to one pitting cycle. The ordinates of curves A and B represent vertical displacement with respect to the conveyor surface while the ordinate of curve C denotes forward motion of the frame from the starting point or rearmost position (FIG. 2). Vertical broken lines indicate the points at which the blade opening commences, the blades are fully open, and fully closed as well as the start of the return stroke of the frame 176.

During initial forward movement of the cup conveyor C, the splitting blade units 32 lower from the position of FIG. 19 to incise the peach P along its suture plane as seen in FIG. 20. Simultaneously, the pit gripping prongs 286 move upwardly through the apertures 116 in the cup conveyor and impale the peach from below lifting it upwardly to a position above the surface of the conveyor.

As the frame 174 and conveyor 26 continue their forward movement, the downward movement of the blades and the upward movement of the prongs continue to affect incising of the peach as seen in FIG. 21. The central recesses 244 in the blades permit incising of the peach flesh on either pit from above while the blades 282 cut the flesh from below the pit.

Simultaneously, the prongs 286 grip the pit. As seen in FIG. 21 and 22 the upper pit gripping blade 198 continues its downward movement with the splitting and flipping blades 200 and 202 until the blade 198 engages the pit clamping it between the blades 282, prongs 286 and the upper pit gripper blade 198. The upper portion of the pit is gripped in the transverse notch 228 and recess 226 in the tip of the upper pit gripping blade 198, best seen in FIG. 14.

Since the size of the pits may vary somewhat and an oversized pit could be crushed or an undersize pit not be gripped firmly, the upper pit gripping blade is slidably mounted and biased downwardly by the spring 220 as seen in FIG. 14.

Figure 23:
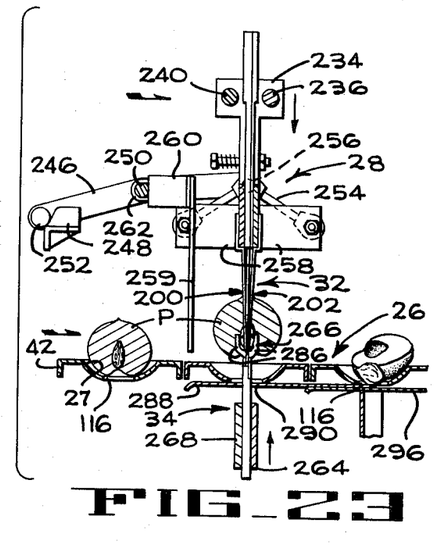
FIG. 23 is a view similar to FIG. 19 at the completion of the incising step.

After the pit is firmly gripped between the upper pit gripping blade 198 and the blades 282 and prongs 286 continue downward motion of the splitting blades 200 and 202 completes the incising of the peach flesh as seen in FIGS. 22 and 23.

Due to the simultaneous lowering of the splitting blade holder 196 and the forward motion of the frame 174, the actuator arm 246 contacts the stationary cam 248 causing the actuator arm to lift which results in a rapid spreading or flipping of the blades 200 and 202 through link 254 as seen in FIG. 24.

Referring now to FIG. 18 and in particular curve A, the path of the blade tips, it will be seen that the blades start their opening motion at 120° in the pitting cycle. At 190° the blades are completely open as shown in FIG. 24.

During the opening of flipping motion of the blades 200 and 202, the prongs 286 restrain the pit so that the pit is not pulled forwardly or rearwardly from between the upper and lower pit gripping blades 198 and 282.

The blades immediately begin to close and are withdrawn upwardly while the pit grippers 34, indicated by curve B (FIG. 18), are withdrawn downwardly. The blades are completely closed at 230° cam rotation to the position in FIG. 25.

The pit gripper 34 is withdrawn through the cup aperture 116 and the opening 290 in the stripper plate 288 (FIG. 15) thereby disengaging any pits which may have been caught in the pit gripper prongs 282. As seen in FIG. 10 the stripper plate 288 and the pan 296 further prevent the pits from dropping through the cup apertures 116 until the pits and separated peach halves are discharged from the forward end of the cup conveyor.

At 250° the pit gripper 34 has been fully withdrawn and the frame 176 with the associated splitting blade units 32, pit gripper 34 and stripper plate 288 move rear-wardly in the return stroke to the starting position for another pitting cycle.

Now it can be seen that under the present invention a full depth flip pitting operation can be carried out on transverse rows of peaches presented to the pitting head in conveying cups. The pitting head not only incises the peaches to full depth and partially around the pit from above, but completes the incision around the pit from below as well as lifting the peaches from their cups for interference free flip pitting. These features cooperate to produce an effective, high speed multi-lane peach pitter.

Although the best mode contemplated for carrying out the present invention has been herein shown and described, it will be apparent that modification and variation may be made without departing from what is regarded to be the subject matter of the invention.

We claim:

1. An apparatus for continuously pitting seamed indented fruit such as peaches or the like, said apparatus being of the type comprising a multiple lane conveyor having transverse rows of centrally apertured fruit cups, means projectable up into said fruit cup apertures for aligning the fruit in said cups to bring the seams into a vertical plane, and means for pitting said fruit; the improvement wherein said pitting means comprises a transverse row of splitting blade units mounted for vertical reciprocation above said conveyor and a transverse row of impaling devices mounted for vertical reciprocation upwardly through said conveyor cups; said splitting blade units each comprising contiguous but separable splitting blades having transversely spaced blade elements for straddling the peach pits, said splitting blade elements being long enough to cut substantially across the entire fruit diameter, a pit gripping blade between said splitting blade elements of each blade unit, means for raising said impaling devices up through said cup apertures and lowering said splitting blade units in timed relation to split the flesh of the fruit along its seams above and to grip the pits of the fruit between said upper pit gripping blades and said impaling devices, and means for separating said splitting blades with a flipping motion to separate the fruit halves and the pits, said means for raising the impaling devices lifting the fruits clear of their cups so that said splitting blades can be separated without striking the cups.

2. The apparatus of claim 1, wherein the pit gripping blades of said splitting blade units are slidably mounted between the associated splitting blade elements, and means for resiliently urging said pit gripping blades downwardly.

3. The apparatus of claim 1, wherein each pit impaling device includes a blade that fits between and is in the plane of said splitting blade elements for completing the cut made by the splitting blades.

4. The apparatus of claim 1, comprising means for driving said fruit cup conveyor continuously, and means for longitudinally reciprocating said pitting means in synchronism with said conveyor.

* * * * *

PO-1050
(5/69)

UNITED STATES PATENT OFFICE
CERTIFICATE OF CORRECTION

Patent No. 3,695,322     Dated August 9, 1974

Inventor(s) GERALD R. ANDERSON et al

It is certified that error appears in the above-identified patent and that said Letters Patent are hereby corrected as shown below:

Col. 1, line 43, after "Upon" delete "(Fig." and insert -- incising --.
Col. 14, line 8, after "seams" insert -- from --.

Signed and sealed this 5th day of November 1974.

(SEAL)
Attest:

McCOY M. GIBSON JR.
Attesting Officer

C. MARSHALL DANN
Commissioner of Patents